(12) United States Patent
Cotsakis et al.

(10) Patent No.: US 10,253,217 B2
(45) Date of Patent: Apr. 9, 2019

(54) ADHERED ROOF STRUCTURE WITH TWO COMPONENT ADHESIVES

(71) Applicant: Carlisle Intangible Company, Syracuse, NY (US)

(72) Inventors: Daniel J. Cotsakis, Rockwall, TX (US); William J. Schneider, Mechanicsburg, PA (US); Michael J. Scanish, Camp Hill, PA (US); Anil G. Shenoy, Mechanicsburg, PA (US); Timothy E. Long, Blacksburg, VA (US); Sam Richard Turner, Blacksburg, VA (US); Alison R. Schultz, Blacksburg, VA (US)

(73) Assignee: Carlisle Intangible Company, Syracuse, NY (US)

( * ) Notice: Subject to any disclaimer, the term of this patent is extended or adjusted under 35 U.S.C. 154(b) by 0 days.

(21) Appl. No.: 15/581,926

(22) Filed: Apr. 28, 2017

(65) Prior Publication Data

US 2017/0313907 A1   Nov. 2, 2017

Related U.S. Application Data

(60) Provisional application No. 62/329,672, filed on Apr. 29, 2016.

(51) Int. Cl.
*E04B 2/00* (2006.01)
*E04B 5/00* (2006.01)
(Continued)

(52) U.S. Cl.
CPC ............. *C09J 4/00* (2013.01); *B32B 37/12* (2013.01); *C08J 5/128* (2013.01); *C09J 4/06* (2013.01);
(Continued)

(58) Field of Classification Search
CPC ..... C09J 4/00; C09J 4/06; C09J 163/00; C09J 2423/00; C08J 5/128; E04D 5/148; E04D 5/10; E04D 11/02
See application file for complete search history.

(56) References Cited

U.S. PATENT DOCUMENTS

| | | | |
|---|---|---|---|
| 7,622,187 B2 | 11/2009 | Clarke et al. | |
| 9,701,876 B2* | 7/2017 | Miller | .............. E04D 11/02 |
| 2004/0029991 A1* | 2/2004 | Warmkessel | ............ B32B 37/12 |
| | | | 522/150 |
| 2006/0247374 A1* | 11/2006 | Beckley | ............ C08F 222/1006 |
| | | | 525/54.2 |
| 2008/0038548 A1* | 2/2008 | Clarke | .................. E04D 5/148 |
| | | | 428/343 |

(Continued)

FOREIGN PATENT DOCUMENTS

| | | |
|---|---|---|
| EP | 1593727 A1 | 11/2005 |
| WO | 2008019191 A1 | 2/2008 |
| WO | 2016054380 A1 | 4/2016 |

OTHER PUBLICATIONS

International Searching Authority, Search Report and Written Opinion issued in corresponding International Applicaiton No. PCT/US2017/030154 dated Sep. 14, 2017 (10 pages).

(Continued)

*Primary Examiner* — Brian D Mattei
(74) *Attorney, Agent, or Firm* — Wood Herron & Evans LLP

(57) ABSTRACT

A roof structure comprises a roof membrane and a roof substrate. A first surface of the roof membrane is adhered to the roof substrate by a two component adhesive, the adhesive being capable of adhering the first surface of the roof membrane to the roof substrate without the use of a high VOC solvent. The two component adhesive includes a Michael donor and a Michael acceptor, and the Michael (Continued)

donor and the Michael acceptor react to form an adhesive film.

11 Claims, 1 Drawing Sheet

(51) Int. Cl.
    *E04B 9/00*     (2006.01)
    *C09J 4/00*     (2006.01)
    *C09J 4/06*     (2006.01)
    *E04D 5/10*     (2006.01)
    *E04D 5/14*     (2006.01)
    *E04D 11/02*     (2006.01)
    *C08J 5/12*     (2006.01)
    *B32B 37/12*     (2006.01)
    *D06N 5/00*     (2006.01)
    *E04D 5/12*     (2006.01)
    *C09J 163/00*     (2006.01)

(52) U.S. Cl.
    CPC .............. *D06N 5/006* (2013.01); *E04D 5/10* (2013.01); *E04D 5/12* (2013.01); *E04D 5/148* (2013.01); *E04D 11/02* (2013.01); *B32B 2305/022* (2013.01); *B32B 2419/06* (2013.01); *C09J 163/00* (2013.01); *C09J 2423/00* (2013.01)

(56) References Cited

U.S. PATENT DOCUMENTS

2014/0045965 A1* 2/2014 Noguchi ................. C09D 11/30
                                                          522/175
2014/0299268 A1* 10/2014 Polus ..................... C09J 163/00
                                                          156/272.4
2016/0280867 A1* 9/2016 Nowak ..................... C09J 4/00

OTHER PUBLICATIONS

Blaiszik, B.J., et al., "Self-Healing Polymers and Composites," Annu. Rev. Mater. Res. 2010, pp. 179-211, vol. 40, Annual Reviews (35 pages).

Buckwalter, Daniel J., et al., "Synthesis and characterization of siloxane-containing poly(urea oxamide) segmented copolymers," Polymer, 2013, pp. 4849-4857, vol. 54, Elsevier Ltd. (9 pages).

Clemens, Robert J., et al., "A Comparison of Catalysts for Crosslinking Acetoacetylated Resins via the Michael Reaction," presented at the 16th Water-Borne and Higher-Solids Coatings Symposium, Feb. 3, 1988, New Orleans, LA, vol. 61, No. 770, Mar. 1989, pp. 83-91 (10 pages).

Li, Qin, et al., "The effect of thiol and ene structures on thiol-ene networks: Photopolymerization, physical, mechanical and optical properties," Polymer, 2009, pp. 2237-2245, vol. 50, Elsevier Ltd. (9 pages).

Mather, Brian D., et al., "Michael addition reactions in macromolecular design for emerging technologies," Science Direct, Progress in Polymer Science, 2006, pp. 487-531, vol. 31, Elsevier Ltd. (45 pages).

Williams, Sharlene R., et al., "Michael Addition Reaction Kinetics of Acetoacetates and Acrylates for the Formation of Polymeric Networks," Progress in Reaction Kinetics and Mechanism, 2007, pp. 165-194, vol. 32, Science Reviews (30 pages).

Williams, Sharlene R., et al., "Novel Michael Addition Networks Containing Urethane Hydrogen Bonding," Journal of Polymer Science: Part A: Polymer Chemistry, 2007, pp. 4118-4128, vol. 45, Wiley Peridicals, Inc. (11 pages).

* cited by examiner

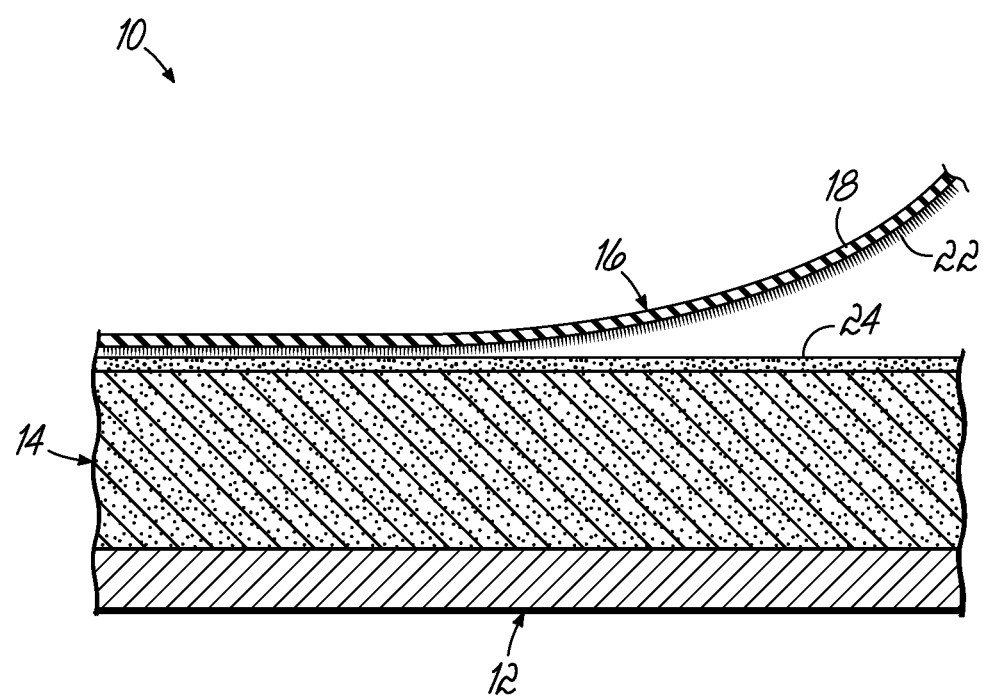

ADHERED ROOF STRUCTURE WITH TWO COMPONENT ADHESIVES

TECHNICAL FIELD

The present invention relates generally to adhered roof structures.

BACKGROUND

Membrane roofs utilize a membrane formed from polymers such as ethylene propylene diene monomer rubber (EPDM), thermoplastic olefin (TPO), or polyvinyl chloride (PVC) as a waterproof barrier. The membrane must be secured on the roof in some way. There are a variety of different methods to do this including ballast (i.e., gravel), mechanical fasteners, and adhesives.

The performance and regulatory demands on adhesive and other materials continues to evolve. Typical adhesives used in roofing applications include polychloroprene- or neoprene-based adhesives. However, these conventional roofing adhesives have aromatic solvents such as toluene or xylenes. These solvents are under increasing environmental pressures as VOC regulations tighten.

SUMMARY

In an embodiment, the present invention provides a roof structure including a roof membrane and a roof substrate. A first surface of the roof membrane is adhered to the roof substrate by a two component adhesive, the adhesive being capable of adhering the first surface of the roof membrane to the roof substrate without the use of a high VOC solvent. The two component adhesive includes a Michael donor and a Michael acceptor; the Michael donor and the Michael acceptor react to form an adhesive film.

The objects and advantages of present will be further appreciated in light of the following detailed descriptions and drawings in which:

BRIEF DESCRIPTION OF THE DRAWING

The FIGURE is a cross sectional view partially broken away of a roof structure utilizing an embodiment of the present invention.

DETAILED DESCRIPTION

Embodiments of the present invention are directed to adhered roof structures and two component adhesives, which may be used in adhered roof structures. With reference to the FIGURE, an exemplary roof structure 10 includes a supporting surface 12 (e.g., roof substrate or roof deck) covered with an insulating foam panel 14. The roofing membrane 16 in the illustrated embodiment has an outer polymeric surface 18 and an inner fleece or fibrous layer 22. An adhesive 24 is utilized to adhere the membrane 16 to the foam panel 14, which is mechanically attached to the supporting surface 12.

A wide variety of different membranes can be used in embodiments of the present invention, either with or without a fleece layer. These can be thermoplastic membranes such as polyvinyl chloride and thermoplastic olefin, as well as thermosets such as EPDM, as well as other single ply roofing membranes. In an embodiment, the membrane 16 is an EPDM membrane, which includes the fleece layer 22. The manufacture of such an exemplary product is disclosed in U.S. Pat. No. 5,620,554, the disclosure of which is hereby incorporated by reference in its entirety.

The membrane is adhered to insulating foam panels 14 by adhesive layer 24. If foam panels are not present, the membrane 16 could be adhered to roof substrate 12 by the adhesive layer 24.

More specifically, the two component adhesive used in embodiments of the present invention that forms the adhesive layer 24 includes an ambient curing adhesive system based on a Michael reaction in which a Michael donor and a Michael acceptor react to form a stable polymeric film capable of bonding to roofing materials (e.g., membrane 16) and substrates (e.g., foam panel 14) with high adhesion. In an embodiment, the adhesive includes bis-acetoacetate as the Michael donor and diacrylate as the Michael acceptor and may be cured at ambient room temperature. Additional suitable Michael acceptors include vinyl ketones, nitro ethylenes, α,β-unsaturated aldehydes, vinyl phosphonates, acrylonitrile, vinyl pyridines, azo compounds and even p-keto acetylenes and acetylene esters. Additional suitable Michael donors include non-enolate nucleophiles such as amines, thiols, and phosphines; these reactions are typically referred to as Michael type additions.

The Michael reaction between diacrylate and bis-acetoacetate is shown below. The diacrylate may be a higher functional acrylate, such as a triacrylate. Suitable multifunctional acrylates are made by Sigma Aldrich and Cray Valley. st. Further, it will be recognized that R and R' can vary widely in their composition, which impacts reactivity, adhesion, and film physical properties (e.g., hardness, elongation, tear resistance, and heat resistance). Exemplary compounds for R and R' include, without limitation, shorter chain alkyls (e.g., C4-C10) and longer chain alkyls that (e.g., C140-C210, or average 2000-3000 MW).

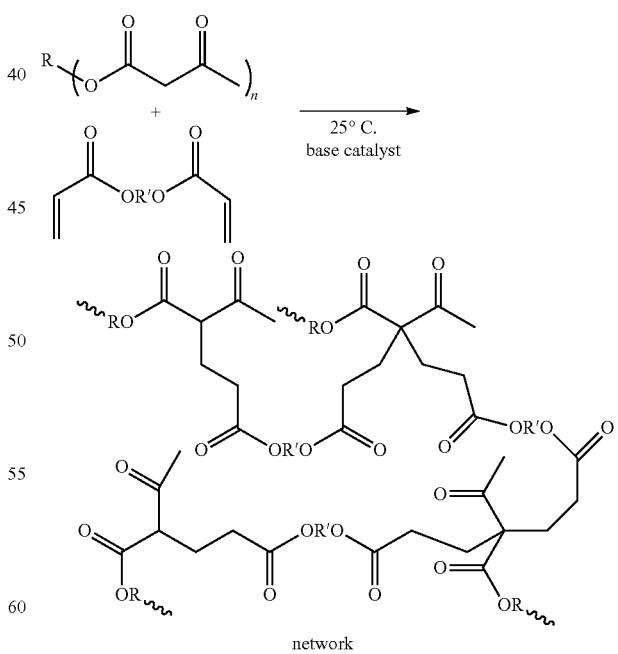

network

The Michael reaction includes a catalyst and does not require an external factor (e.g., moisture, air, UV, etc.) to drive the reaction. In addition, this reaction chemistry does not produce any by-products during the reaction. The catalyst activates the Michael donors and enables the addition reaction across a carbon-carbon multiple bond of Michael acceptors.

Typical catalysts include organic bases, such as tetramethylguanidine (TMG), triethylamine, 1,8 diazabicyclo [5.4.0]undec-7-ene (DBU), and 1,5 diazabicyclo[4.3.0]non-5-ene (DBN), as well as inorganic bases such as potassium carbonate, boron trifluoride, aluminum trifluoride, aluminum trichloride, and zinc chloride.

In embodiments of the invention, the adhesive formulation may include additives depending on the particular application. For example, the adhesive may include a variety of materials that increase the usefulness of the adhesive in roofing applications. Exemplary additives include, without limitation, tackifiers, diluents, viscosity modifiers, stabilizers, fillers, adhesion promoters, and/or other materials.

Tackifiers used in this type of adhesive include, but are not limited to, resins (e.g., aliphatic and aromatic hydrocarbon, phenolic, ketonic, rosin, terpene, etc.) and liquid polymers (e.g., polyisobutylene, EPDM, etc.). Diluents and viscosity modifiers may be used to regulate the rheology of the adhesive. Exemplary diluents and viscosity modifiers include, but are not limited to, oils (e.g., paraffinic, aromatic, naphthenic, soy, etc.), plasticizers (e.g., phthalates, dibasic ester, adipate esters, epoxidized esters, etc.), or viscosity modifying liquids or solids (e.g., polymers, thixotropes, clays, etc.). While the addition of such components to conventional adhesives (e.g., based on solvent, water, or polyurethane) alters the reactivity of the components of the adhesive, the Michael reaction may not be affected, which improves the versatility of the particular adhesive composition.

Formulas for the Michael adhesive may include a 1:1.2 molar ratio of bis-acetoacetate to diacrylate, for example. Formulas for the adhesive may use the combination of bis-acetoacetate and diacrylate at the 1:1.2 molar ratio as a basis to represent 100 parts per hundred resin (phr). Embodiments may include an adhesive formula having: 100 phr of bis-acetoacetate and diacrylate; 0.5 to 5 phr of a catalyst; 0 to 250 phr of a resin; 0 to 250 phr of a liquid polymer; and 0 to 20 phr of a viscosity modifier. For example, in an embodiment, the adhesive comprises: 100 phr of bis-acetoacetate and diacrylate; 1 phr of a DBU catalyst; and 11 phr of an aliphatic hydrocarbon resin. In another embodiment, the adhesive comprises: 100 phr of bis-acetoacetate and diacrylate; 1 phr of a DBU catalyst; and 11 phr of polyisobutylene.

In embodiments of the invention, the ambient curing two component adhesive is applied to a roofing substrate to adhere a roofing membrane to the roof structure. For example, with reference to the FIGURE, the adhesive 24 is applied to the foam panel 14 (which is typically mechanically-fastened to the roof substrate 12), and the roofing membrane 16 is placed over the adhesive-coated panels. The adhesive may be applied using a low VOC nonaromatic or regulated solvent or by applying the components (e.g., oligomers or monomers) without solvent. The membrane 16 can be applied to the adhesive layer 24 immediately after the application of adhesive layer 24.

Typically, the components of the adhesive are mixed with the catalyst at the construction site and sprayed or otherwise applied on the membrane surface and/or on the surface of the roof substrate. Alternatively, or additionally, an encapsulation process may be used to separate one of the components of the adhesive system (e.g., the catalyst, Michael donor, or Michael acceptor) from the other components in the reaction. The adhesive including the encapsulated catalyst would be applied to the substrate, and the catalyst released to initiate the curing process via a mechanical shear event. For example, a roller may be used to release the catalyst after the adhesive has been applied. It should be recognized that the adhesive composition, including any additives and catalyst, may be varied based on the desired curing time, the adhesive and strength properties required in the intended application, and the compatibility of the composition with the selected membrane and insulation substrate.

The Michael adhesives disclosed herein can also be used to bond overlapped sections of adjacent membrane sheets to form lap seams.

The adhesive properties of interest in roofing membranes of poly(hydrogenated butadiene) based Michael donors and acceptors were evaluated. The poly(hydrogenated butadiene) based Michael donors and acceptors demonstrated universal adhesive performance with EPDM, PVC, and TPO roofing substrates. Poly(hydrogenated butadiene) based Michael donors and acceptors were synthesized using a facile approach involving modification of commercially available Krasol® diols. These reactive oligmeric diols offer hydrogenation levels greater than 97%, Mn values of 2,000 and 3,000 g/mol, excellent thermal stability, good weatherability, hydrophobicity, low color, high clarity, and low glass transition temperatures ($T_g$=–55° C.), affording their compatibility for applications involving acid and base resistance, adhesion, asphalt miscibility, electrical insulation, and low temperature flexibility. The synthesis of Krasol® diacrylates and reaction conditions involving 2,000 g/mol Krasol® diol are shown below as an example synthetic procedure.

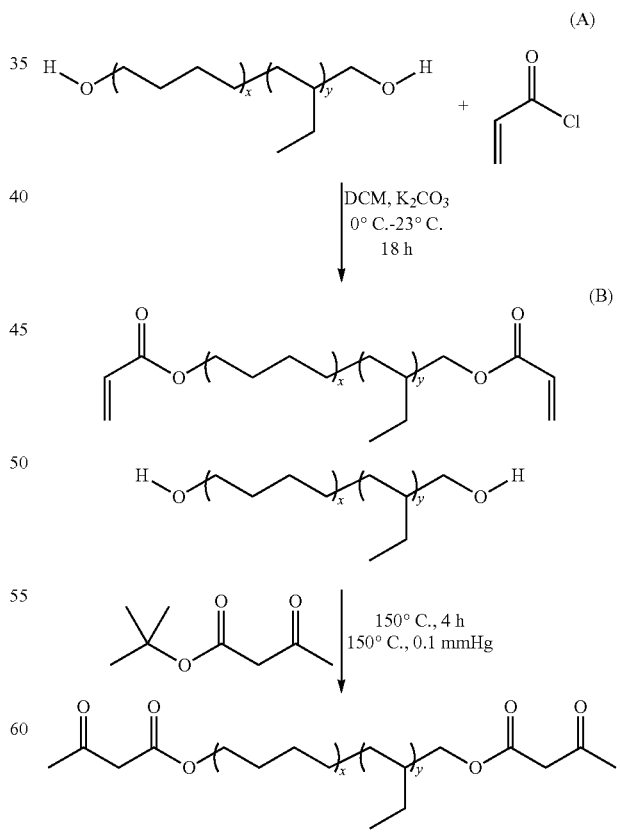

A two-neck 500 mL round-bottomed flask, equipped with a 50 mL addition funnel containing acryloyl chloride (5.2 g, 0.055 mol) in anhydrous DCM (20 mL), was charged with 2,000 g/mol Krasol® diol (50 g, 0.025 mol) and anhydrous $K_2CO_3$ (10.37 g, 0.075 mol) and was sealed with a rubber septum. Anhydrous DCM (110 mL) was cannulated into the reaction flask, and an ice bath was assembled to cool the reaction contents to 0° C. Acryloyl chloride was added dropwise overnight and the reaction was allowed to warm to 23° C. Salt byproduct was filtered and the organic solute was washed 3× with $H_2O$. DCM was removed under reduced pressure (5 mmHg) and the product was isolated as a clear liquid and was dried in vacuo at 23° C. (48.23 g, 96% yield). $^1$HNMR (400 MHz, CDCl3): 6.47 (d, 2H), 6.22 (dd, 2H), 5.77 (d, 2H), 4.13 (m, 4H), 0.75-1.5 (polymer backbone). Molecular weight determination from $^1$HNMR showed Mn=2,200.

An example synthetic route for achieving these bisacetoacetate donors follows. 2,000 g/mol Krasol® diol (10.0 g, 10 mmol) and tBuAcAc (6.3 g, 40 mmol, 4 equiv.) were charged to a two-necked 100-ml flask, equipped with a short-path distillation head, receiving flask, and magnetic stint. The mixture was maintained at 150° C. for 3 h and vacuum (0.1 mmHg) was applied to remove the tert-butanol by-product and excess tBuAcAc. An additional 6.3 g tBuAcAc was added and heating continued for 3 h at 150° C. in order to ensure quantitative functionalization. Vacuum (0.1 mmHg) at 150° C. was applied to remove volatile starting reagents and reaction by-products. $^1$HNMR spectroscopy of the Krasol® BisAcAc oligomers confirmed the desired composition. $^1$HNMR (400 MHz, CDCl3) of the 2000 g/mol Krasol® BisAcAc: 0.75-1.5 (polymer backbone), 1.24 ppm (dd, 6H, CHCH$_3$OAcAc), 2.26 ppm (s, 6H, COCH$_2$COCH$_3$), 5.08 ppm (m, 4H, CH$_2$CHCH$_3$OAcAc), 5.29 ppm (s, enol C=CH—C=O).

Mixing equal molar ratios of these acceptors and donors with catalytic DBU enables a 2-component reactive curing system and provides a crosslinked Michael network under ambient conditions (23° C.). Catalyst concentration, temperature, and crosslinking agent compositions tune the reaction kinetics, facilitating cure times that range from 10 min to 300 min.

Rheological analysis elucidated crosslinking reaction kinetics, revealing the effects of catalyst concentration, temperature, and acceptor/donor $M_n$ on gelation time. A steady-strain oscillation experiment monitored the storage and loss moduli (G', G") as the viscous, 2-component curing system crosslinked into an elastic, free-standing film network. The G' and G" crossover point represented the viscoelastic transition point, known as the gel point, and occurred at various times as a function of the tested variables. In the case of catalyst concentration, increasing DBU concentration from 1 wt. %, 2 wt. %, and 3 wt. % afforded faster gelation in tunable time frames of 80 min, 60 min, and 15 min (for $M_n$ 2,000 g/mol or 3,000 g/mol). At 2 wt. % DBU catalyst, the gelation point was approximately 60 min.

Temperature variation is a major concern for roofing adhesion. To be competitive, an adhesive should exhibit high performance adhesion year-round during all seasons. Rheological studies demonstrated crosslinking efficiency for the Michael adhesives disclosed herein under extreme cold (−10° C.), ambient (25° C.), and extreme heat (50° C.) conditions (for Mn 2,000 g/mol or 3,000 g/mol). Steady-strain oscillation studies at these temperatures, with a constant catalyst concentration of 1 wt. % DBU, demonstrated Michael network formation for all temperatures. Crosslinking behavior occurred the slowest at −10° C., presumably corresponding to increased oligomeric chain rigidity and decreased intermolecular motion. Increasing the temperature to ambient conditions increased chain mobility and enabled crosslinking to occur within 80 min. The fastest crosslinking time (20 min) occurred at 50° C., where intermolecular motion approached fluidic behavior and the addition reaction was kinetically favored. $M_n$ also influenced gel time, revealing slightly longer time frames for curing systems involving 3,000 g/mol vs. 2,000 g/mol Krasol® oligomers under comparable temperatures. Most evident, −10° C. corresponded to the strongest effect of $M_n$ on gel time and indicated a 40% increase in gel time for the 3,000 g/mol curing system in comparison to the 2,000 g/mol system.

A 2000 g/mol Krasol® bisacetoacetate was reacted with the commercially available 1,4-butanediol diacrylate (1,4-BDA). Rheological investigations elucidated gel time variation (min) as a function of temperature (° C.) (for $M_n$ 2,000 g/mol or 3,000 g/mol). Comparable to previous temperature studies, the slowest gel time occurred at −10° C. and gel time increased with increasing temperature. Crosslinking occurred rapidly at both 25 and 50° C., faster in comparison to curing systems involving Krasol® diacrylates. For the curing system involving 1,4-RDA, gel time occurred within 10 min as opposed to 30 min for systems involving Krasol® diacrylates. This presumably resulted from the molecular weight differences in 1,4-BDA and Krasol® diacrylates.

Tuning gel times of crosslinked Michael networks provides flexibility during rooftop applications, allowing construction employees to activate Michael adhesives according to roof dimensions and membrane supply. These solvent-free adhesives offer low viscosity for coating and require no solvent evaporation prior to adhesion. Gelation occurs within minutes and 24 h ensures complete formation of crosslinked networks. 180° peel tests investigated adhesion strength and failure modes of cured membrane samples including EPDM to EPDM, PVC to PVC, and TPO to TPO substrates. These studies provided insight into adhesive compatibility with the various roofing membranes, and provided peel strength data in comparison to conventional commercial bonding adhesives. Michael adhesives involving 2000 g/mol Krasol® bisacetoacetate behaved as a universal curing system for three different roofing membranes, revealing comparable peel strength to the highest performing, solvent-based commercial adhesives and improved strength in comparison to low VOC adhesives. Table I reports average peel loads and failure modes for all roofing samples with Michael adhesives along with suitable adhesive controls. Advantageously, all Michael adhesive samples revealed cohesive failure and suggested adhesive dependence on strength of the crosslinked networks.

TABLE 1

| Substrate/adhesives | Failure Mode | Average Load (N) | Average Load (lbs) |
|---|---|---|---|
| EPDM/2K Krasol ® | Cohesive | 4.0 | 0.9 |
| EPDM/2K Krasol ®: 1,4 BDA | Cohesive | 4.0 | 0.9 |
| EPDM/Neoprene | Cohesive | 3.5 | 0.8 |
| EPDM/Low VOC | Adhesive | 1.5 | 0.3 |
| PVC/2K Krasol ® | Cohesive | 4.0 | 0.9 |
| PVC/2K Krasol ®: 1,4 BDA | Cohesive | 3.5 | 0.8 |
| PVC/Low VOC | Cohesive | 3.5 | 0.8 |
| TPO/2K Krasol ® | Cohesive | 10.0 | 2.3 |
| TPO/2K Krasol ®: 1,4 BDA | Cohesive | 5.0 | 1.1 |
| TPO/TPO | Cohesive | 4.5 | 1.0 |
| TPO/Low | Cohesive | 5.0 | 1.1 |

The Michael adhesives described herein represent a green alternative to solvent-based roofing adhesives and provide a large host of donors and acceptors, with optional catalysts.

The Michael adhesives are tunable for roofing membrane substrates. The rheological studies elucidated effects of catalyst concentration, temperature, $M_n$, donor/acceptor compositions on gelation times, revealing tunable gel times in a 10-300 min time range for example. 180° peel tests revealed crosslinked Michael networks as high performing adhesives for binding roofing substrates, exhibiting comparable peel strengths to traditional solvent-based adhesives and improved strengths to Low VOC adhesives.

While specific embodiments have been described in considerable detail to illustrate the present invention, the description is not intended to restrict or in any way limit the scope of the appended claims to such detail. The various features discussed herein may be used alone or in any combination. Additional advantages and modifications will readily appear to those skilled in the art. The invention in its broader aspects is therefore not limited to the specific details, representative apparatus and methods and illustrative examples shown and described. Accordingly, departures may be made from such details without departing from the scope of the general inventive concept.

What is claimed is:

1. A roof structure comprising:
   a roof membrane; and
   a roof substrate,
   wherein a first surface of the roof membrane is adhered to the roof substrate by a two component adhesive, the adhesive being capable of adhering the first surface of the roof membrane to the roof substrate without the use of a high VOC solvent, and wherein the two component adhesive includes a Michael donor and a Michael acceptor, and wherein the Michael donor and the Michael acceptor react to form an adhesive film, and wherein the adhesive comprises:
   100 phr of the Michael donor and the Michael acceptor;
   0.5 to 5 phr of a catalyst;
   0 to 250 phr of a resin;
   0 to 250 phr of a liquid polymer; and
   0 to 20 phr of a viscosity modifier.

2. The roof structure claimed in claim 1, wherein the Michael donor is selected from the group consisting of: bis-acetoacetate, a vinyl ketone, a nitro ethylene, an α, β-unsaturated aldehyde, a vinyl phosphonate, acrylonitrile, vinyl pyridine, an azo compound, a p-keto acetylene, an acetylene ester, and a non-enolate nucleophile.

3. The roof structure claimed in claim 1, wherein the Michael acceptor is a multi-functional acrylate.

4. The roof structure claimed in claim 1, wherein the Michael donor is bis-acetoacetate and the Michael acceptor is diacrylate.

5. The roof structure claimed in claim 4, wherein a molar ratio of bis-acetoacetate to diacrylate is 1:1.2.

6. The roof structure claimed in claim 1, wherein the Michael donor and the Michael acceptor are poly(hydrogenated butadiene) based.

7. The roof structure claimed in claim 1, wherein the catalyst is encapsulated.

8. The roof structure claimed in claim 1, wherein the adhesive includes one or more additives selected from the group consisting of tackifiers, diluents, viscosity modifiers, and stabilizers.

9. The roof structure claimed in claim 1, wherein the roof membrane is selected from the group consisting of polyvinyl chloride (PVC), thermoplastic olefin (TPO), and ethylene propylene diene monomer rubber (EPDM).

10. The roof structure claimed in claim 1, wherein the adhesive comprises:
    100 phr of the Michael donor and the Michael acceptor;
    1 phr of a DBU catalyst; and
    11 phr of an aliphatic hydrocarbon resin.

11. The roof structure claimed in claim 1, wherein the adhesive comprises:
    100 phr of the Michael donor and the Michael acceptor;
    1 phr of a DBU catalyst; and
    11 phr of polyisobutylene.

* * * * *